United States Patent
Sasaki

(10) Patent No.: US 7,804,768 B2
(45) Date of Patent: Sep. 28, 2010

(54) METHOD FOR REDUNDANT LINKING LINES AND WIDE AREA NETWORK NODE DEVICE

(75) Inventor: Takanori Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 11/987,395

(22) Filed: Nov. 29, 2007

(65) Prior Publication Data
US 2008/0159124 A1 Jul. 3, 2008

(30) Foreign Application Priority Data
Dec. 28, 2006 (JP) .............................. 2006-356473

(51) Int. Cl.
*H04J 1/16* (2006.01)
(52) U.S. Cl. .................. 370/217; 370/392; 370/395.51
(58) Field of Classification Search ................ 370/217, 370/395.51, 222, 392
See application file for complete search history.

(56) References Cited

U.S. PATENT DOCUMENTS

| | | | |
|---|---|---|---|
| 6,144,633 A * | 11/2000 | Ikeda et al. ................. | 370/217 |
| 7,359,389 B2 * | 4/2008 | Kusayanagi ................. | 370/401 |
| 7,602,701 B1 * | 10/2009 | Parker et al. ................. | 370/217 |
| 2001/0029546 A1 * | 10/2001 | Motoyama ................... | 709/235 |
| 2003/0187934 A1 * | 10/2003 | Nishikawa et al. .......... | 709/206 |
| 2005/0141415 A1 * | 6/2005 | Broberg et al. .............. | 370/223 |
| 2005/0147121 A1 * | 7/2005 | Burrell et al. ................ | 370/468 |
| 2007/0086355 A1 * | 4/2007 | Sawada et al. .............. | 370/252 |
| 2007/0140271 A1 * | 6/2007 | Amante et al. .............. | 370/401 |

FOREIGN PATENT DOCUMENTS

JP 2004-297475 10/2004

* cited by examiner

*Primary Examiner*—Ricky Ngo
*Assistant Examiner*—Dewanda Samuel
(74) *Attorney, Agent, or Firm*—Staas & Halsey LLP

(57) ABSTRACT

A WAN node device includes a failure monitoring unit that monitors failure in a first LAN-side input-output unit and a second LAN-side input-output unit. If failure in the first LAN-side input-output unit or the second LAN-side input-output unit is detected, failure is notified to a switching controller. Upon receiving a failure notification, the switching controller selects a normally functioning LAN-side input-output unit. Thus, the WAN node device passes on packets to a LAN-communication linking device via either the first LAN-side input-output unit or the second LAN-side input-output unit selected by the switching controller.

8 Claims, 14 Drawing Sheets

RESPONSE PACKETS CORRESPONDING TO PACKETS RECEIVED ARE TRANSMITTED AS A RESPONSE TO LAN-COMMUNICATION LINKING DEVICE USING ONLY ONE LINE AND USING BRIDGE FUNCTION

PACKETS CONTAINING SA:00-00-00-00-00-02/DA: 00-00-00-00-00-01 ARE RECEIVED AT PORT B (VLAN 10)

FIG.2F
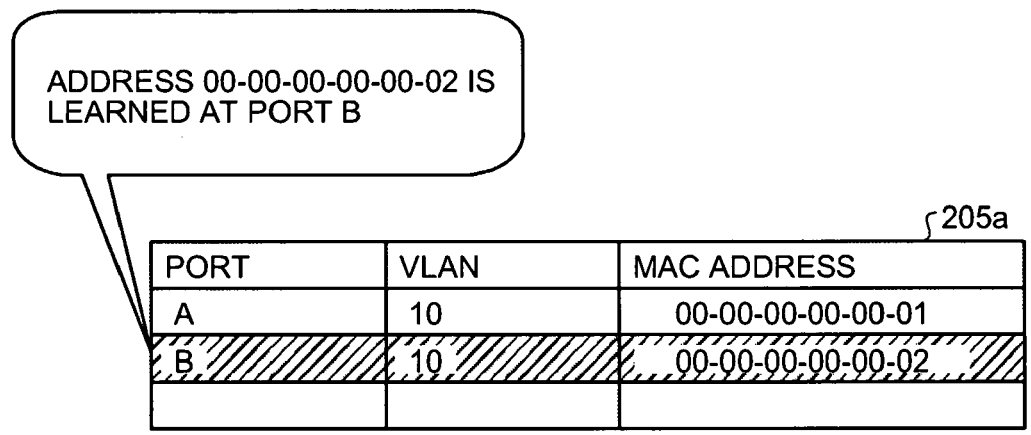
ADDRESS 00-00-00-00-00-02 IS LEARNED AT PORT B
FIG.2G
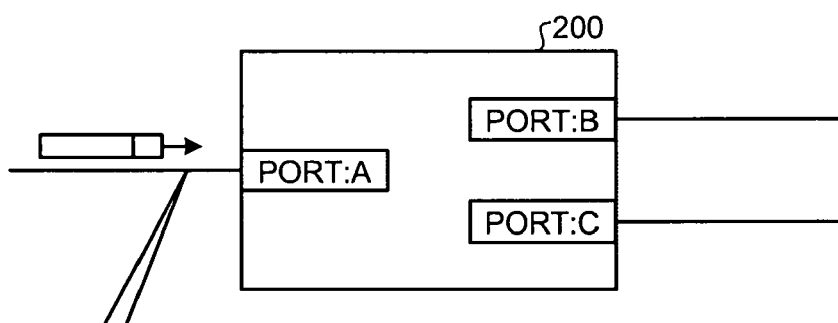
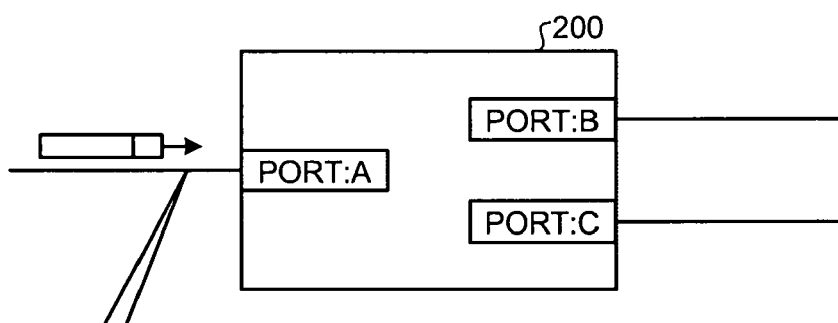
PACKETS CONTAINING SA:00-00-00-00-00-01/DA: 00-00-00-00-00-02 ARE RECEIVED AGAIN AT PORT A (VLAN10)

| PORT | VLAN | MAC ADDRESS |
|------|------|-------------|
| A | 10 | 00-00-00-00-00-01 |
| B | 10 | 00-00-00-00-00-02 |
| | | |

TABLE IS REFERRED AND PORT THAT KNOWS ADDRESS 00-00-00-00-00-02 IS SEARCHED (BECAUSE PORT LEARNS MAC ADDRESS, PACKETS ARE TRANSMITTED ONLY TO PORT B)

| PORT | VLAN | MAC ADDRESS |
|---|---|---|
| A | 10 | 00-00-00-00-00-01 |
| B | 10 | 00-00-00-00-00-02 |
| A | 100 | 00-00-00-01-01-01 |
| C | 100 | 00-00-00-02-02-02 |
| A | 10 | 00-00-00-00-00-11 |
| C | 10 | 00-00-00-00-00-22 |
| A | 20 | 00-00-00-00-11-11 |
| B | 20 | 00-00-00-00-33-33 |
| A | 10 | 00-00-00-00-00-05 |
|   |   |   |

FIG.2J

| PORT | VLAN | MAC ADDRESS | |
|------|------|-------------|---|
| A | 10 | 00-00-00-00-00-01 | ⌐205a |
| ////// | ////// | ////// | |
| A | 100 | 00-00-00-01-01-01 | |
| C | 100 | 00-00-00-02-02-02 | ALL ENTRIES THAT INCLUDE PORT B ARE DELETED |
| A | 10 | 00-00-00-00-00-11 | |
| C | 10 | 00-00-00-00-00-22 | |
| A | 20 | 00-00-00-00-11-11 | |
| ////// | ////// | ////// | |
| A | 10 | 00-00-00-00-00-05 | |
| ////// | ////// | ////// | |

FIG.2K

WAN NODE DEVICE THAT DETECTS FAILURE IN ACTIVE CHANNEL ON WORK SIDE, SYNCHRONIZES SWITCH AND BRIDGE WITHIN DEVICE AND SWITCHES TO PROTECTION SIDE
DUE TO THIS, WAN NODE DEVICE RECEIVES AND TRANSMITS PACKETS ONLY FROM/TO PROTECTION LINE

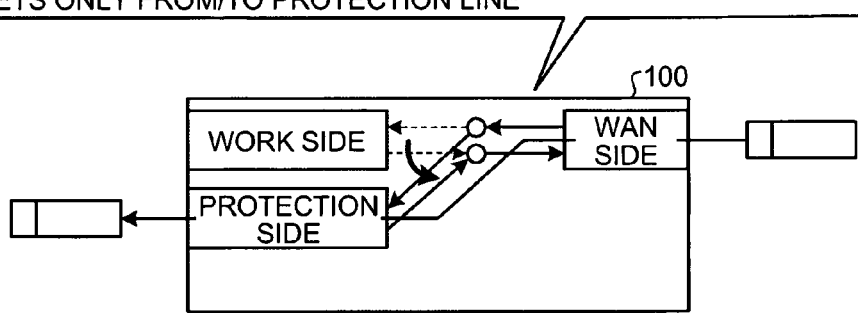

PACKETS CONTAINING SA:00-00-00-00-00-01/DA: 00-00-00-00-00-02 ARE RECEIVED AGAIN AT PORT A (VLAN10)

| PORT | VLAN | MAC ADDRESS | 205a |
|------|------|-------------|------|
| A | 10 | 00-00-00-00-00-01 | |
| | | | |
| A | 100 | 00-00-00-01-01-01 | |
| C | 100 | 00-00-00-02-02-02 | |
| A | 10 | 00-00-00-00-00-11 | |
| C | 10 | 00-00-00-00-00-22 | |
| A | 20 | 00-00-00-00-11-11 | |
| | | | |
| A | 10 | 00-00-00-00-00-05 | |
| | | | |

TABLE IS REFERRED AND PORT THAT KNOWS ADDRESS 00-00-00-00-00-02 IS SEARCHED (BECAUSE MAC ADDRESS IS YET TO BE LEARNED AT THIS TIME, PACKETS ARE TRANSMITTED TO ALL PORTS OTHER THAN PORT A)

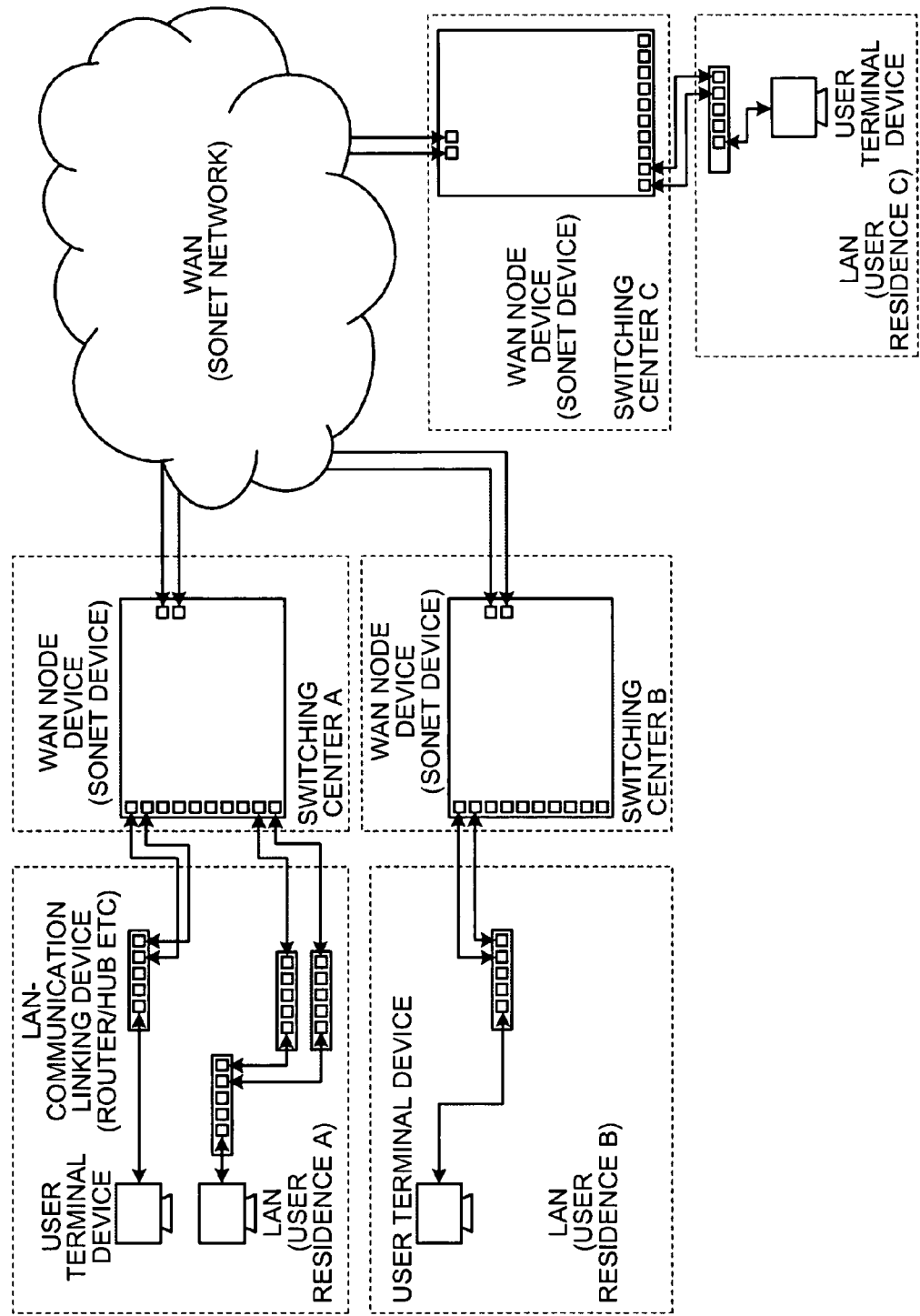

METHOD FOR REDUNDANT LINKING LINES AND WIDE AREA NETWORK NODE DEVICE

BACKGROUND OF THE INVENTION

1. Field of the Invention

The present invention relates to a method for redundantly linking a wide area network (WAN) node device that forms a WAN and a local area network (LAN) communication linking device that forms a LAN, to enable communication between the two, and the WAN node device.

2. Description of the Related Art

To ensure failure resilience of a network formed using Ethernet (registered trademark), a spanning tree (a spanning tree protocol) that provides redundant configuration in a network is commonly used. In the spanning tree, one path is set as an active path and remaining paths are supposed to be alternate paths at the time of failure.

For example, in the network that uses the spanning tree, when failure occurs in a port of a switch device linked to the active path, a communication control method that enables quick search of the alternate paths using a media access control (MAC) address that the switch device has learned is disclosed in Japanese Patent Application Laid-open No. 2004-297475.

A backbone link of the network connects different Ethernet networks, each formed of user lines, by connecting their nodes. Such a backbone link needs to be highly reliable and hence is often configured by synchronous optical network/synchronous digital hierarchy (SONET/SDH).

To increase the reliability when linking and relaying the Ethernet network by SONET/SDH, for a connection between the Ethernet network and the SONET/SDH, it has been suggested to introduce redundant configuration also in a connection between a SONET/SDH switch device on the SONET/SDH network side and an Ethernet switch device on the Ethernet network side.

In a conventional technology disclosed earlier, because all the switch devices are Ethernet switch devices, a MAC-address learning function is included and the MAC address can be used for searching for the alternate paths. However, when the switch devices other than the Ethernet switch devices such as the SONET/SDH switch devices, some of which do not have the MAC-address learning function, are combined, the alternate paths cannot be searched and secured.

Specifically, when the redundant configuration is introduced in the connection between the SONET/SDH switch device on the SONET/SDH side and the Ethernet switch device on the Ethernet network side, because the SONET/SDH switch devices do not include the MAC-address learning function as disclosed in the conventional technology mentioned earlier, searching for an alternate path using a key of the MAC address and securing the same is impossible.

SUMMARY OF THE INVENTION

It is an object of the present invention to at least partially solve the problems in the conventional technology.

According to an aspect of the present invention, a method is for redundantly linking a WAN node device that forms a WAN and a LAN-communication linking device that forms a LAN, to enable communication between the two. The method includes selecting one of a plurality of WAN-side input-output steps by which packets are exchanged between the WAN and the LAN in the WAN node device. A packet from the LAN to the WAN is received and a packet from the WAN to the LAN is sent, by the selected WAN-side input-output step.

According to another aspect of the present invention, a WAN node device, forming a WAN and redundantly linked with a LAN-communication linking device that forms a LAN, includes plurality of WAN-side input-output units that input and output packets exchanged between the WAN and the LAN; and a switching unit that switches between the WAN-side input-output units so that the packets are exchanged via one of the WAN-side input-output units. A packet from the LAN to the WAN is received and a packet from the WAN to the LAN is sent, by the WAN-side input-output unit selected by the switching unit.

According to still another aspect of the present invention, a LAN-communication linking device, forming a LAN and redundantly linked with a WAN node device that forms a WAN, includes a source terminal identification data storing unit that stores therein source terminal identification data of received packets, in association with identification data of a LAN-side input-output unit that has received the packets; an input-output step selecting unit that transmits, based on the identification data of the LAN-side input-output unit stored by the source terminal identification data storing unit, the packets from the LAN to the WAN node device by a LAN-side input-output unit selected from a plurality of LAN-side input-output units; a failure monitoring unit that monitors failure in the LAN-side input-output unit; and a source terminal identification data deleting unit that deletes the source terminal identification data stored in association with the LAN-side input-output unit when failure in the LAN-side input-output unit is detected using the failure monitoring unit.

According to still another aspect of the present invention, A redundant linking system is for redundantly linking a WAN node device that forms a WAN and a LAN-communication linking device that forms a LAN, to enable communication between the two. The system includes a switching unit that selects one of a plurality of WAN-side input-output units by which packets are exchanged between the WAN and the LAN in the WAN node device. A packet from the LAN to the WAN is received and a packet from the WAN to the LAN is sent, by the WAN-side input-output unit selected by the switching unit.

The above and other objects, features, advantages and technical and industrial significance of this invention will be better understood by reading the following detailed description of presently preferred embodiments of the invention, when considered in connection with accompanying drawings.

BRIEF DESCRIPTION OF THE DRAWINGS

FIG. 2F is a drawing of a sixth part of the time series representation of the functioning of the communication relay system according to the embodiment;

FIG. 2G is a drawing of a seventh part of the time series representation of the functioning of the communication relay system according to the embodiment;

FIG. 2I is a drawing of a ninth part of the time series representation of the functioning of the communication relay system according to the embodiment;

FIG. 2J is a drawing of a tenth part of the time series representation of the functioning of the communication relay system according to the embodiment;

FIG. 2K is a drawing of an eleventh part of the time series representation of the functioning of the communication relay system according to the embodiment;

FIG. 6 is a drawing of a network configuration according to the embodiment.

DETAILED DESCRIPTION OF THE PREFERRED EMBODIMENTS

Exemplary embodiments of a method for redundantly connecting lines and a wide area network (WAN) node device according to the present invention are explained below with reference to the accompanying drawings. In the embodiments described below, the present invention is applied to a connecting method for connecting an add-drop node device that forms synchronous optical network/synchronous digital hierarchy (SONET/SDH) and an Ethernet (registered trademark) device that includes a local area network (LAN). Hereinafter, the wide area network formed using the SONET/SDH, the add-drop node device, the Ethernet (registered trademark) device, and a system that includes and connects the WAN node device and the LAN-communication linking device will be referred to as WAN, WAN node device, LAN-communication linking device, and communication relay system, respectively.

Figure 1:
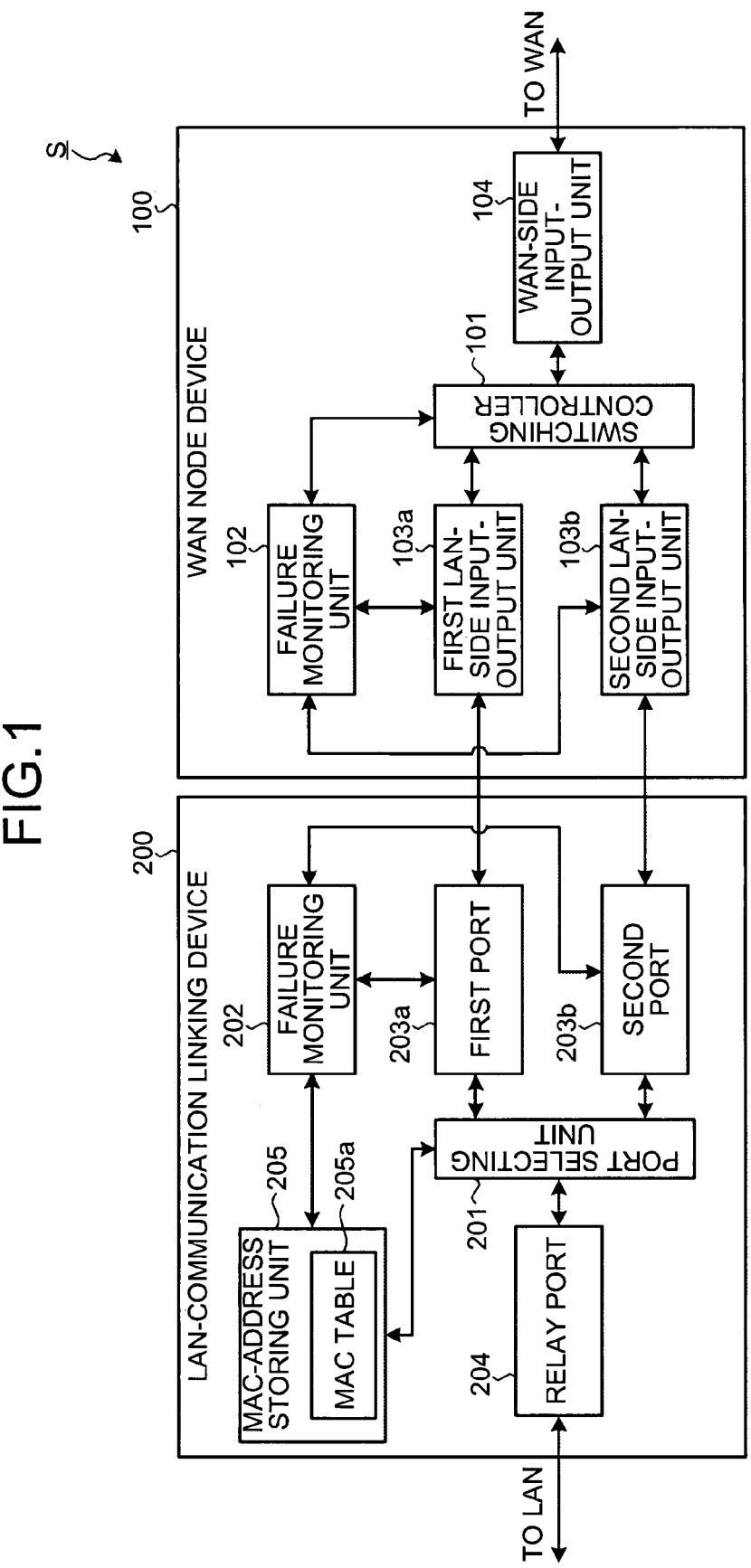
FIG. 1 is a functional block diagram of a communication relay system according to an embodiment.

A structure of the communication relay system according to an embodiment of the present invention is explained below. FIG. 1 is a functional block diagram of the communication relay system according to the embodiment. As shown in FIG. 1, in a communication relay system S according to the embodiment, a WAN node device 100 and a LAN-communication linking device 200 are linked.

In the communication relay system S, the WAN node device 100 passes on packets input from the WAN to the LAN-communication linking device 200 and outputs the packets passed on by the LAN-communication linking device 200 to the WAN. The LAN-communication linking device 200 passes on the packets input from the LAN to the WAN node device 100 and outputs the packets passed on by the WAN node device 100 to the LAN.

The WAN node device 100 includes a switching controller 101, a failure monitoring unit 102, a first LAN-side input-output unit 103a, a second LAN-side input-output unit 103b, and a WAN-side input-output unit 104. It is supposed that the first LAN-side input-output unit 103a is an active unit and the second LAN-side input-output unit 103b is a stand-by unit. Hereinafter, the first LAN-side input-output unit 103a and the second LAN-side input-output unit 103b will be commonly referred to as LAN-side input-output unit.

The switching controller 101 includes a switch that selects and switches over to either the first LAN-side input-output unit 103a or the second LAN-side input-output unit 103b that receives the packets from the LAN-communication linking device 200. The switching controller 101 includes a bridge that selects and switches over to either the first LAN-side input-output unit 103a or the second LAN-side input-output unit 103b that transmits the packets to the LAN-communication linking device 200. The switch and the bridge operate in conjunction, selecting and switching over to the same LAN-side input-output unit.

The failure monitoring unit 102 monitors failure that could occur in the first LAN-side input-output unit 103a and the second LAN-side input-output unit 103b. Generally, failure can occur in a line (an optical cable etc.) that links the first LAN-side input-output unit 103a of the WAN node device 100 to a first port 203a and in a line (an optical cable etc.) that links the second LAN-side input-output unit 103b of the WAN node device 100 to a second port 203b. If failure is detected in the first LAN-side input-output unit 103a or the second LAN-side input-output unit 103b, failure is notified to the switching controller 101. Upon receiving the failure notification, the switching controller 101 terminates the connection with the faulty LAN-side input-output unit and switches over to a normally functioning LAN-side input-output unit.

The first LAN-side input-output unit 103a and the second LAN-side input-output unit 103b are interfaces that pass on the packets, which are input from the WAN to the WAN node device 100, to the LAN-communication linking device 200. The packets which is input from the WAN to the WAN node device 100 are passed on to the LAN-communication linking device 200 via either the first LAN-side input-output unit 103a or the second LAN-side input-output unit 103b, which is selected by a switching control exerted by the switching controller 101.

The WAN-side input-output unit 104 is an interface that passes on the packets, which is input from the WAN to the WAN node device 100, to the switching controller 101 and outputs the packets passed on by the switching controller 101 to the WAN.

The LAN-communication linking device 200 includes a port selecting unit 201, a failure monitoring unit 202, the first port 203a, the second port 203b, a relay port 204, and a MAC-address storing unit 205 having a MAC table 205a. Hereinafter, the first port 203a and the second port 203b will be commonly referred to as port. The first port 203a is communicably linked to the first LAN-side input-output unit 103a of the WAN node device 100. The second port 203b is communicably linked to the second LAN-side input-output unit 103b of the WAN node device 100. Accordingly, the first port 203a is an active port and the second port 203b is a stand-by port.

The port selecting unit 201 refers to the MAC table 205a of the MAC-address storing unit 205 and selects the port via which the packets are transmitted to the WAN node device

100. Specifically, the port selecting unit 201 stores in the MAC table 205*a*, a relationship between source terminal identification data included in the received packets and identification data of the port via which the packets are received. When terminal identification data of a destination packet of the packets for transmission are stored in the MAC table 205*a*, the port selecting unit 201 selects the port via which the packet is to be transmitted according to the identification data of the port that correspond to the terminal identification data.

The failure monitoring unit 202 monitors failure that could occur in the first port 203*a* and the second port 203*b*. Generally, failure can occur in the line (an optical cable etc.) that links the first LAN-side input-output unit 103*a* of the WAN node device 100 to the first port 203*a* or in the line (an optical cable etc.) that links the second LAN-side input-output unit 103*b* of the WAN node device 100 to the second port 203*b*. If failure in the first port 203*a* or the second port 203*b* is detected, the failure monitoring unit 202 notifies the MAC-address storing unit 205 of failure. Upon receiving the notification, the MAC-address storing unit 205 deletes all the entries including the faulty port. Due to the deletion, the packets containing specific source terminal identification data are not passed on to the WAN node device 100 via the faulty port. The packets having terminal identification data not recorded in the MAC table 205*a* are passed on as a flooding operation to the WAN node device 100 via all the ports.

The first port 203*a* and the second port 203*b* are interfaces that pass on the packets, which are input from the LAN to the LAN-communication linking device 200, to the WAN node device 100. The packets, which are input from the LAN to the LAN-communication linking device 200, are passed on to the WAN node device 100 via either the first port 203*a* or the second port 203*b* or both, depending upon the selection by the port selecting unit 201.

The relay port 204 is an interface that passes on the packets, which are input from the LAN to the LAN-communication linking device 200, to the port selecting unit 201 and outputs the packets passed on by the port selecting unit 201 to the LAN.

The MAC-address storing unit 205 includes the MAC table 205*a* and performs storage management of the data stored in the MAC table 205*a*. Particularly, when failure in the port is detected by the failure monitoring unit 202, the MAC-address storing unit 205 receives the failure detection notification and deletes from the MAC table 205*a* all the entries that include the identification data of the port in which failure has occurred.

Figure 2A:
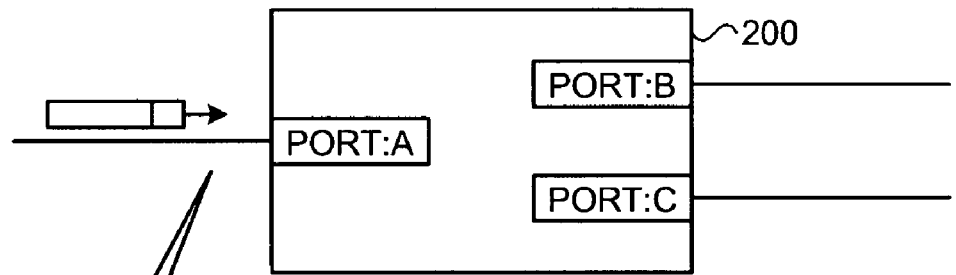
FIG. 2A is a drawing of a first part of a time series representation of a functioning of the communication relay system according to the embodiment.

An operation of the communication relay system shown in FIG. 1 is explained below. FIGS. 2A to 2M are drawings for explaining the functioning of the communication relay system. In FIGS. 2A to 2M, the functioning of the communication relay system is shown in a time series. FIG. 2A explains an operation in the LAN-communication linking device when the packet is received, representing an action of the communication relay system. Port A, port B, and port C shown in FIG. 2A correspond to the relay port 204, the first port 203*a*, and the second port 203*b*, respectively.

As shown in FIG. 2A, the LAN-communication linking device 200 receives from the LAN, at the port A, the packet having "00-00-00-00-00-01 in the source address (SA), "00-00-00-00-00-02" in the destination address (DA), and "10" in VLAN ID. Then, the LAN-communication linking device 200 adds an entry (or a record) containing "A" in the port, "10" in the VLAN ID, and "00-00-00-00-00-01" in the MAC address to the MAC table 205*a*.

In other words, the LAN-communication linking device 200 stores (or learns) the relationship between the source terminal identification data (SA) in the received packet and the identification data (port A) of the port that has received the packet, along with the VLAN ID that serves as a VLAN identifier.

Figure 2B:
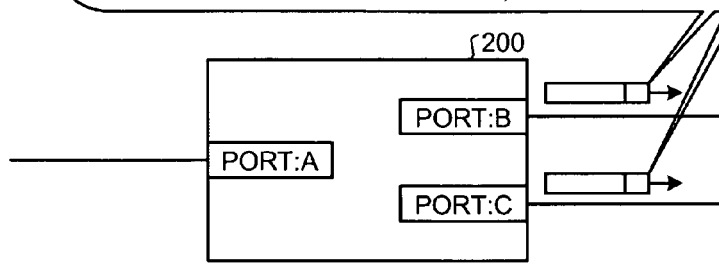
FIG. 2B is a drawing of a second part of the time series representation of the functioning of the communication relay system according to the embodiment.

FIG. 2B is a drawing of a second part of the time series representation of the functioning of the communication relay system according to the embodiment. As shown in FIG. 2B, the LAN-communication linking device 200 refers to the MAC table 205*a*, retrieves an entry containing "00-00-00-00-00-02" in the address, and searches for the corresponding port. It is supposed that at this point the address "00-00-00-00-00-02" is yet to be learned by the MAC table 205*a*. Therefore, the packets are transmitted via all the ports (ex. port B and port C) except the port A, which is the receiving port for the packets.

Figure 2C:
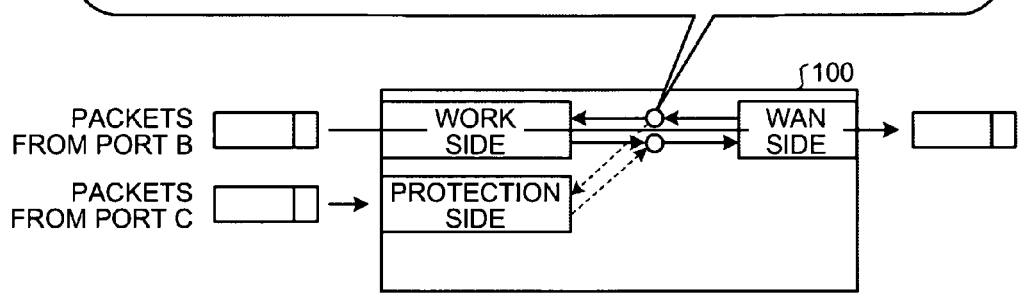
FIG. 2C is a drawing of a third part of the time series representation of the functioning of the communication relay system according to the embodiment.

Referring to FIG. 2C, a drawing of a third part of the time series representation of the functioning of the communication relay system according to the embodiment, an operation performed by the WAN node device will be explained. In FIG. 2C, the terms "work side", "protection side", and "WAN side" correspond, respectively, to the first LAN-side input-output unit 103*a*, the second LAN-side input-output unit 103*b*, and the WAN-side input-output unit 104 of the WAN node device 100. A line linking the LAN-communication linking device 200 to the WAN node device 100 for "work side" is referred to as work line and a line linking the LAN-communication linking device 200 to the WAN node device 100 for "protection side" is referred to as protection line.

As shown in FIG. 2C, the WAN node device 100 receives a packet from the port B of the LAN-communication linking device 200 at the work side and receives a packet from the port C of the LAN-communication linking device 200 at the protection side. As shown in FIG. 2B, the packets received by the port B and the port C are the packets originating from the flooding operation of the LAN-communication linking device 200, and both the packets are the same.

Upon receiving the same packets from the work line and the protection line, using a function of the switching controller 101, the WAN node device 100 transmits to the WAN side, only the packet received from one of them. In other words, the WAN node device 100 only transmits the packet received from the work line selected by the switching controller 101 to the WAN side.

Figure 2D:
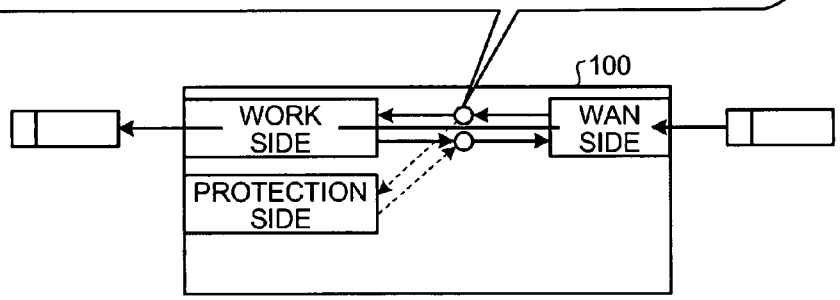
FIG. 2D is a drawing of a fourth part of the time series representation of the functioning of the communication relay system according to the embodiment.

FIG. 2D is a drawing of a fourth part of the time series representation of the functioning of the communication relay system according to the embodiment and is an operation performed by the WAN node device that receives the packet from the WAN side. The WAN transmits a response packet in response to the packet received by the WAN node device 100 from the LAN-communication linking device 200. Upon receiving the response packet, the WAN node device 100 transmits the response packet to the LAN-communication linking device 200 using a bridge function to select either the work line or the protection line. As shown in FIG. 2D, because the work side is selected by the switching controller 101, the response packet is transmitted to the LAN-communication linking device 200 using the work line.

Figure 2E:
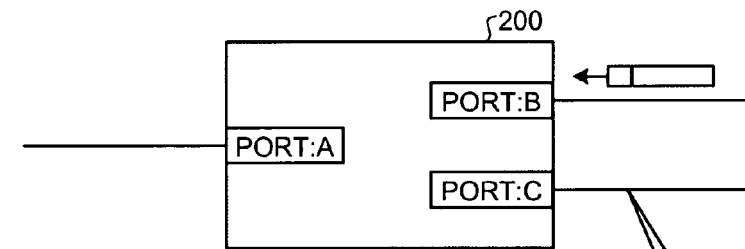
FIG. 2E is a drawing of a fifth part of the time series representation of the functioning of the communication relay system according to the embodiment.

FIG. 2E is a drawing of a fifth part of the time series representation of the functioning of the communication relay system and is an operation performed by the LAN-communication linking device upon receiving the packet from the WAN node device. As shown in FIG. 2E, the packet transmitted by the work line of the WAN node device 100 is input to the port B of the LAN-communication linking device 200. In other words, the LAN-communication linking device 200 receives at the port B the packet having "00-00-00-00-00-02" in SA, "00-00-00-00-00-01" in DA, and "10" in the VLAN ID.

FIG. 2F is a drawing of a sixth part of the time series representation of the functioning of the communication relay system for explaining a learning process of the MAC table 205a carried out in the LAN-communication linking device that has received the packet from the WAN node device. As shown in FIG. 2F, when the LAN-communication linking device 200 receives at the port B the packet having the values "00-00-00-00-00-02" in SA, "00-00-00-00-00-01" in DA, and "10" in the VLAN ID, the LAN-communication linking device 200 adds to the MAC table 205a an entry containing the values "B", "10", and "00-00-00-00-00-02" in the fields of "Port", "VLAN ID", and "MAC address", respectively.

FIG. 2G is a drawing of a seventh part of the time series representation of the functioning of the communication relay system for explaining packet reception in the LAN-communication linking device. As shown in FIG. 2G, the LAN-communication linking device 200 once again receives from the LAN, at the port A, the packet having "00-00-00-00-00-01" in SA, "00-00-00-00-00-02" in DA, and "10" in the VLAN ID.

Figure 2H:
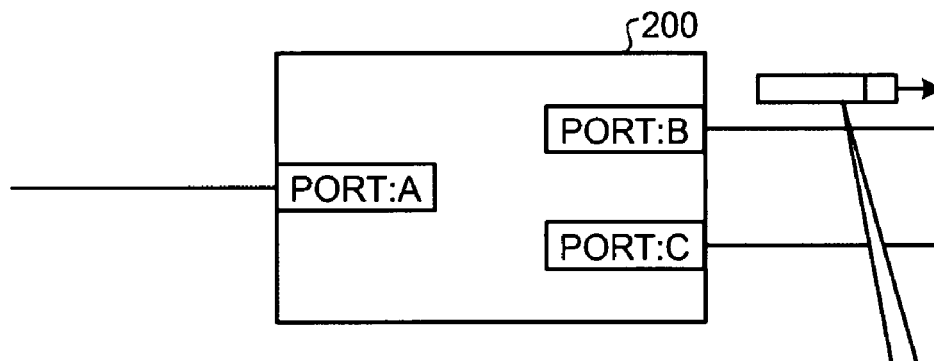
FIG. 2H is a drawing of an eighth part of the time series representation of the functioning of the communication relay system according to the embodiment.
Figure 21:
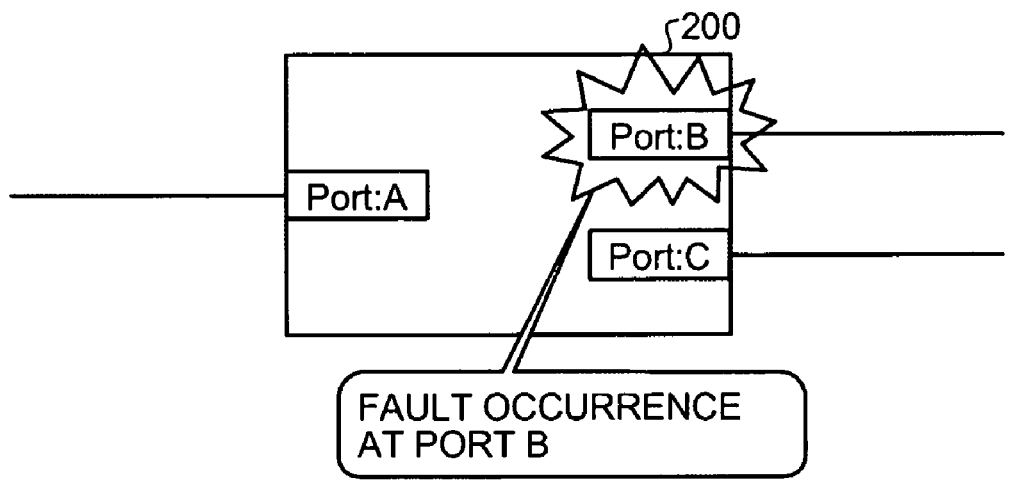

FIG. 2H is a drawing of an eighth part of the time series representation of the functioning of the communication relay system and is an operation in the LAN-communication linking device upon receiving the packet. As shown in FIG. 2H, the LAN-communication linking device 200 refers to the MAC table 205a, retrieves an entry that includes the address "00-00-00-00-00-02", and searches for the corresponding port. At this point, because the address "00-00-00-00-00-02" is already learned in the MAC table 205a, the packet is transmitted via the port B which has been associated with the address "00-00-00-00-00-02" in the MAC table 205a.

FIG. 2I is a drawing of a ninth part of the time series representation of the functioning of the communication relay system and is an operation of the LAN-communication linking device when failure has occurred in a linking line. It is supposed that failure has occurred at the port B of the LAN-communication linking device 200 after accumulating the addresses in the MAC table 205a by learning the addresses with repeated performances of packet transmission to and packet reception from the WAN node device 100 as shown in FIGS. 2A and 2F. Failure is also detected in the WAN node device 100.

FIG. 2J is a drawing of a tenth part of the time series representation of the functioning of the communication relay system and is an operation of the LAN-communication linking device when failure has occurred in the linking line. As shown in FIG. 2J, the LAN-communication linking device 200 refers to the MAC table 205a and deletes all the entries that include "port B".

FIG. 2K is a drawing of an eleventh part of the time series representation of the functioning of the communication relay system for explaining an operation of the WAN node device that receives the packet from the WAN after failure has occurred in the linking line. As shown in FIG. 2K, upon detecting failure at the port B, the WAN node device 100 synchronizes the switch and the bridge using the switching controller 101. In other words, the WAN node device 100 synchronizes the packet transmission to the WAN side and the packet transmission to the LAN side, to switch from the work side to the protection side. As shown in FIG. 2K, the protection side is selected by switching the switch function and the bridge function by the switching controller 101. Therefore, the response packet from the WAN is transmitted to the LAN-communication linking device 200 using the protection line.

Figure 2L:
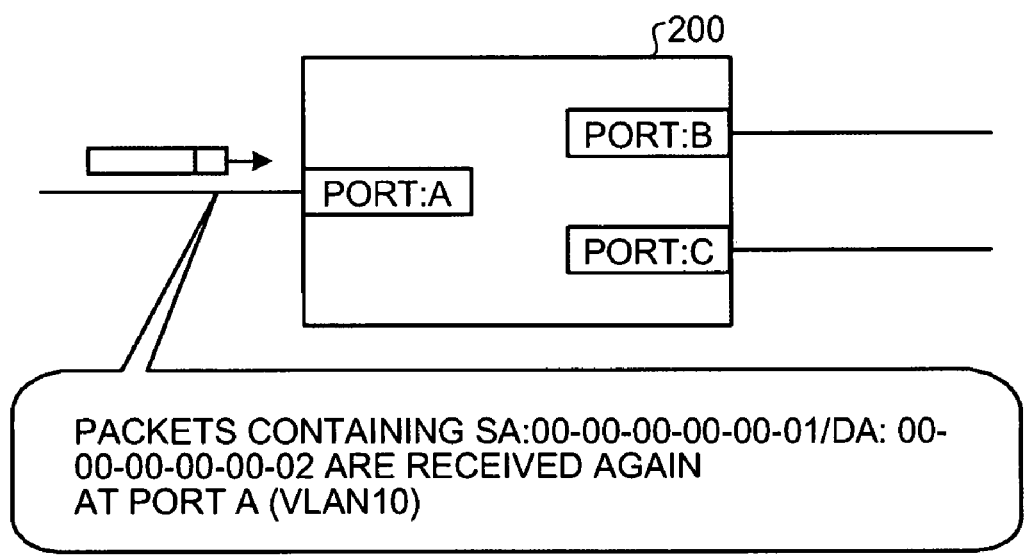
FIG. 2L is a drawing of a twelfth part of the time series representation of the functioning of the communication relay system according to the embodiment.

FIG. 2L is a drawing of a twelfth part of the time series representation of the functioning of the communication relay system for explaining an operation of the LAN-communication linking device that receives the packet after failure has occurred in the linking line. It is supposed that, in a similar manner to the explanation in FIG. 2A, the LAN-communication linking device 200 again receives from the LAN and, at the port A, the packet having "00-00-00-00-00-01" in SA, "00-00-00-00-00-02" in DA, and "10" in VLAN ID.

Figure 2M:
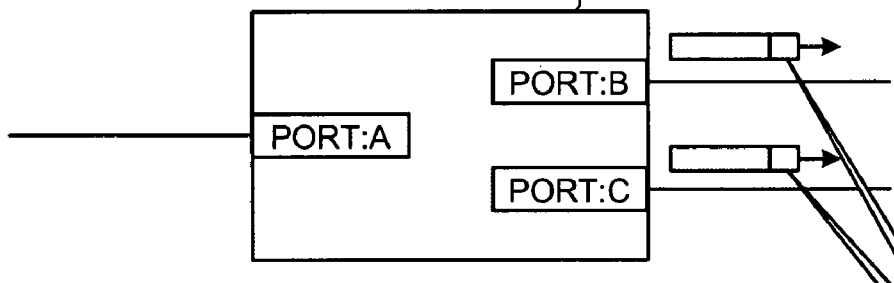
FIG. 2M is a drawing of a thirteenth part of the time series representation of the functioning of the communication relay system according to the embodiment.

FIG. 2M is a drawing of a thirteenth part of the time series representation of the functioning of the communication relay system for explaining the operation of the LAN-communication linking device that receives the packet after failure has occurred in the linking line.

At this point, all the entries associated with "port B" in the MAC table 205a are deleted by the operation of the communication relay system shown in FIG. 2J.

Accordingly, in a similar manner to the operation shown in FIG. 2B, the LAN-communication linking device 200 retrieves the MAC table 205a with "00-00-00-00-00-02" written in DA of the received packet as a retrieval key. As mentioned earlier, because all the addresses containing "00-00-00-00-00-02" are deleted and therefore yet to be learned at this point, the LAN-communication linking device 200 shifts to the flooding operation. In other words, the LAN-communication linking device 200 transmits the packets via all the ports (in this embodiment, port B and port C) except the port A which used to receive the packet.

Thereafter, by the operation similar to that described earlier, the MAC table 205a is learned sequentially via the protection line, and the packets are transmitted and received using the protection line.

Thus, the WAN node device 100 and the LAN-communication linking device 200 can be redundantly linked without having to modify the LAN-communication linking device 200, without having to delink any line on the side of the WAN node device 100, and without having to use link aggregation.

According to the embodiment, the failure monitoring unit 102 and the failure monitoring unit 202 monitor failure in the linking line between the WAN node device 100 and the LAN-communication linking device 200. When failure occurs, the packets are immediately routed via whichever of the first LAN-side input-output unit 103a and the second LAN-side input-output unit 103b selected by the switching controller 101, enabling a prompt failure handling.

According to the embodiment mentioned earlier, the failure monitoring unit 102 and the failure monitoring unit 202 monitor failure in the linking line between the WAN node device 100 and the LAN-communication linking device 200. When failure occurs, the MAC-address storing unit 205 immediately deletes all the entries that include the information of the port to which the linking line is connected. Thus, failure handling is carried out easily by using the flooding operation of the LAN-communication linking device 200 along with prompt failure handling.

Figure 3:
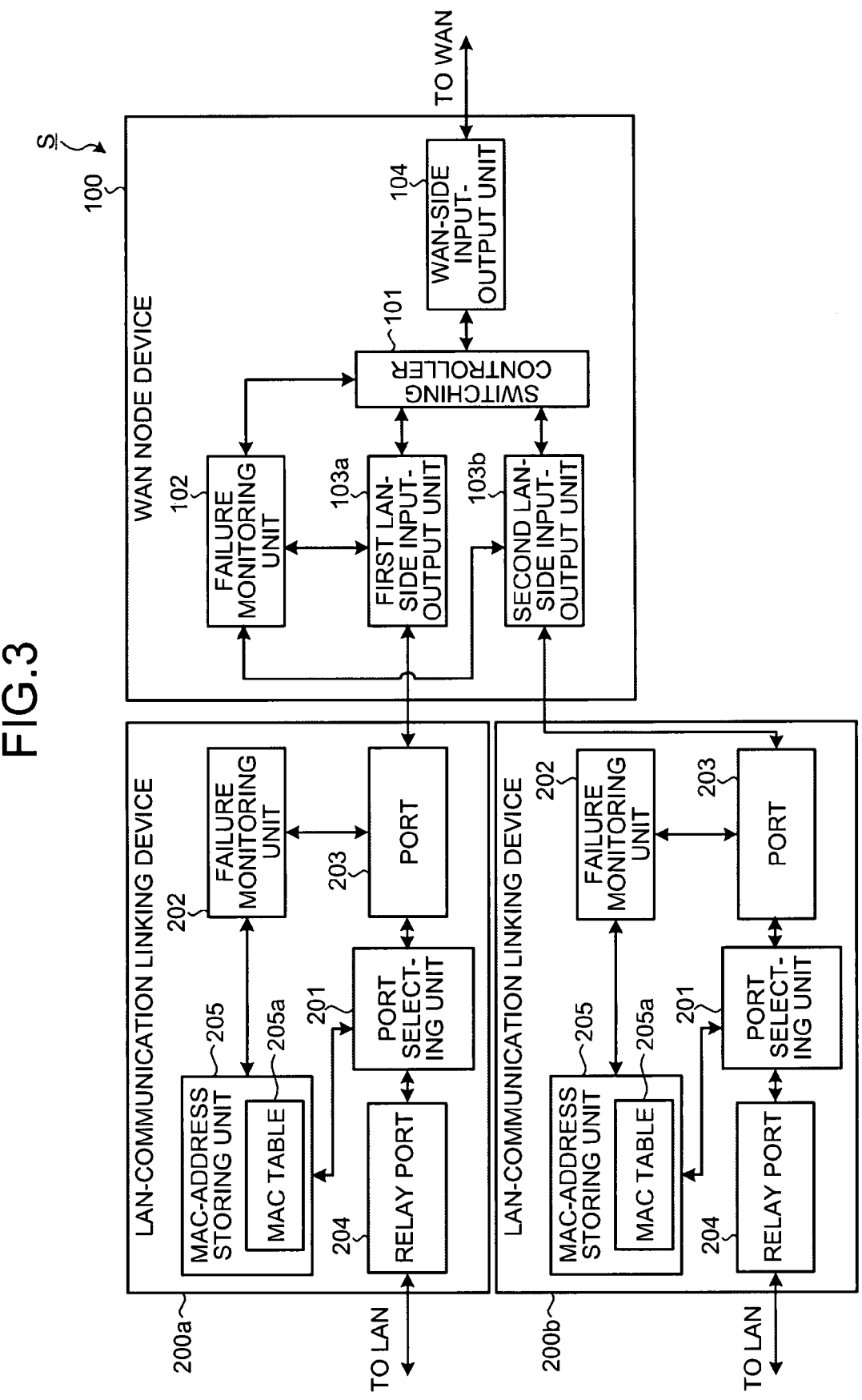
FIG. 3 is a functional block diagram of the communication relay system according to a first modification.

Next, a first modification of the present invention is explained below. FIG. 3 is a functional block diagram of a communication relay system according to the first modification of the present invention. According to the communication relay system S of this modification, a LAN-communication linking device 200a and a LAN-communication linking device 200b can be connected to the first LAN-side input-output unit 103a and the second LAN-side input-output unit 103b, respectively, of the WAN node device 100 shown in FIG. 1.

Each of the LAN-communication linking devices 200a and 200b includes the port selecting unit 201, the failure monitoring unit 202, a port 203, the relay port 204, and the MAC-address storing unit 205 having the MAC table 205a. The port 203 of the LAN-communication linking device 200a is connected to the first LAN side input-output unit 103a to exchange packets between them. Similarly, the port 203 of the LAN-communication linking device 200b is connected to the port 203 to exchange packets between them. Similar to the WAN node device 100 of FIG. 1, if it is supposed that the first LAN-side input-output unit 103a is the active unit and the second LAN-side input-output unit 103b is the stand-by unit, accordingly, the LAN-communication linking device 200a acts as an active device and the LAN-communication linking device 200b acts as a stand-by device.

Irrespective of transmission of packets from the LAN-communication linking device 200 to the WAN node device 100, a response packet is not transmitted from the WAN node device 100 to the LAN-communication linking device 200 when a communication path is not established by switching of the switch and the bridge in the WAN node device 100. This allows two different LAN-communication linking devices 200 to be connected to the LAN-side input-output units 103a and 103b of the WAN node device 100.

Because the LAN-communication linking device 200 has not learned an output port via which the packet is output to the WAN node device 100, the packet is always transmitted to the WAN node device 100 via all the ports (flooding operation). Under such a condition, if the communication path is established by the switching of the switch and the bridge in the WAN node device 100, the response packet is transmitted from the WAN node device 100 to the LAN-communication linking device 200, and the LAN-communication linking device 200 learns the output port via which the packet is output to the WAN node device 100. Thus, thereafter, the packet is transmitted to the WAN node device 100 via the learned output port.

In the communication relay system with a single LAN-communication linking device 200, a standby path between the LAN-communication linking device 200 and the WAN node device 100 cannot be secured when the LAN-communication linking device 200 itself breaks down. This problem can be avoided by connecting different LAN-communication linking devices 200 to each LAN-side input-output unit of the WAN node device 100.

Figure 4:
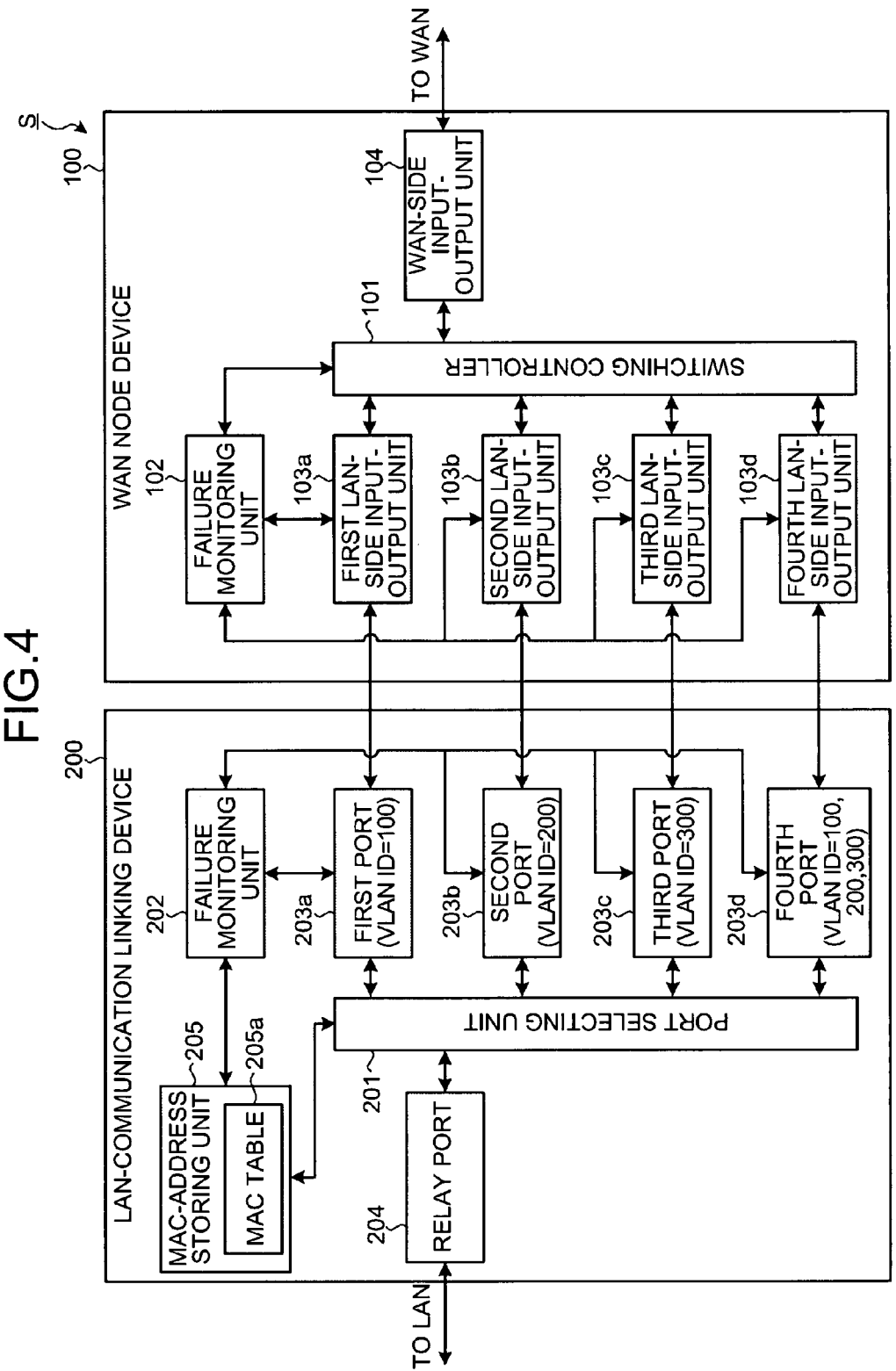
FIG. 4 is a functional block diagram of the communication relay system according to a second modification.

Next, a second modification of the present invention is explained below. FIG. 4 is a functional block diagram of the communication relay system according to a second modification. In the second modification, one stand-by system is provided corresponding to one active system as shown in the embodiment and the first modification. However, the present invention is not to be thus limited and can be applied even when one stand-by system is provided corresponding to a plurality of active systems. As shown in FIG. 4, the communication relay system S according to the second modification includes the WAN node device 100 and the LAN-communication linking device 200.

The WAN node device 100 of the communication relay system S according to the second modification includes the switching controller 101, the failure monitoring unit 102, the first LAN-side input-output unit 103a, the second LAN-side input-output unit 103b, a third LAN-side input-output unit 103c, a fourth LAN-side input-output unit 103d, and the WAN-side input-output unit 104. Hereinafter, the first LAN-side input-output unit 103a, the second LAN-side input-output unit 103b, the third LAN-side input-output unit 103c, and the fourth LAN-side input-output unit 103d will be commonly referred to as LAN-side input-output unit. It is supposed that the first LAN-side input-output unit 103a, the second LAN-side input-output unit 103b, and the third LAN-side input-output unit 103c are the active units and the fourth LAN-side input-output unit 103d is the stand-by unit.

The switching controller 101 includes a switch that selects and switches over to the LAN-side input-output unit that receives the packets from the LAN-communication linking device 200, and includes a bridge that selects and switches over to the LAN-side input-output unit that transmits the packets to the LAN-communication linking device 200. The switch and the bridge work in conjunction, selecting and switching over to the same LAN-side input-output unit.

Other functional blocks of the WAN node device 100 according to the second modification are identical to those of the WAN node device 100 shown in FIG. 1, and are therefore not described again.

The LAN-communication linking device 200 of the communication relay system S according to the second modification includes the port selecting unit 201, the failure monitoring unit 202, the first port 203a having VLAN ID set to 100, the second port 203b having VLAN ID set to 200, a third port 203c having VLAN ID set to 300, a fourth port 203d having the VLAN ID set to 100, 200, and 300, the relay port 204, and the MAC-address storing unit 205 having the MAC table 205a.

The first port 203a, the second port 203b, the third port 203c, and the fourth port 203d are commonly referred to as port. Further, the first port 203a, the second port 203b, the third port 203c, and the fourth port 203d are communicably linked to the first LAN-side input-output unit 103a, the second LAN-side input-output unit 103b, the third LAN-side input-output unit 103c, and the fourth LAN-side input-output unit 103d of the WAN node device 100, respectively. Accordingly, the first port 203a, the second port 203b, and the third port 203c are the active ports, and the fourth port 203d is the stand-by port.

Consequently, lines that, respectively, link the first port 203a to the first LAN-side input-output unit 103a, the second port 203b to the second LAN-side input-output unit 103b, and the third port 203c to the third LAN-side input-output unit 103c are supposed to be active lines, and a line that links the fourth port 203d to the fourth LAN-side input-output unit 103d is supposed to be a stand-by line.

Other functional blocks of the LAN-communication linking device 200 according to the second modification are identical to those of the LAN-communication linking device 200 shown in FIG. 1 and therefore not described again.

Thus, all VLAN IDs set to the active ports are set to the fourth port 203d of LAN-communication linking device 200 linked to the fourth LAN-side input-output unit 103d of the WAN node device 100. In other words, the VLAN ID of 100 set to the first port 203a, the VLAN ID of 200 set to the second port 203b, and the VLAN ID of 300 set to the third port 203c are all set to the fourth port 203d.

Consequently, a packet having an unlearned MAC address is output from the first port 203a (or the second port 203b or the third port 203c) and the fourth port 203d. Because the switch and bridge on the WAN node device 100 select all the active input-output units, all the MAC addresses are learned only at the ports linked to the active line side.

When failure occurs in any of the active lines, the switch and the bridge on the corresponding active line synchronize and select a stand-by line on the WAN node device 100 side, and delete the MAC addresses learned at the corresponding port on the LAN-communication linking device 200 side. Due to this, the packets are transmitted and received thereafter using the stand-by line. When failure in one active line is being replaced by the stand-by line, failure in another active line cannot be backed up.

Thus, by using a plurality of ports and a plurality of VLANs, a single stand-by line can back up a plurality of active lines. Due to this, a network that has higher availability than a single line that does not include an stand-by line can be provided at low cost.

A line multilink method in which a single stand-by line helps three active lines is described in the second modification. However, the number of the active line is not limited to three, and two or more than four active lines can be backed up by a single stand-by line.

Figure 5:
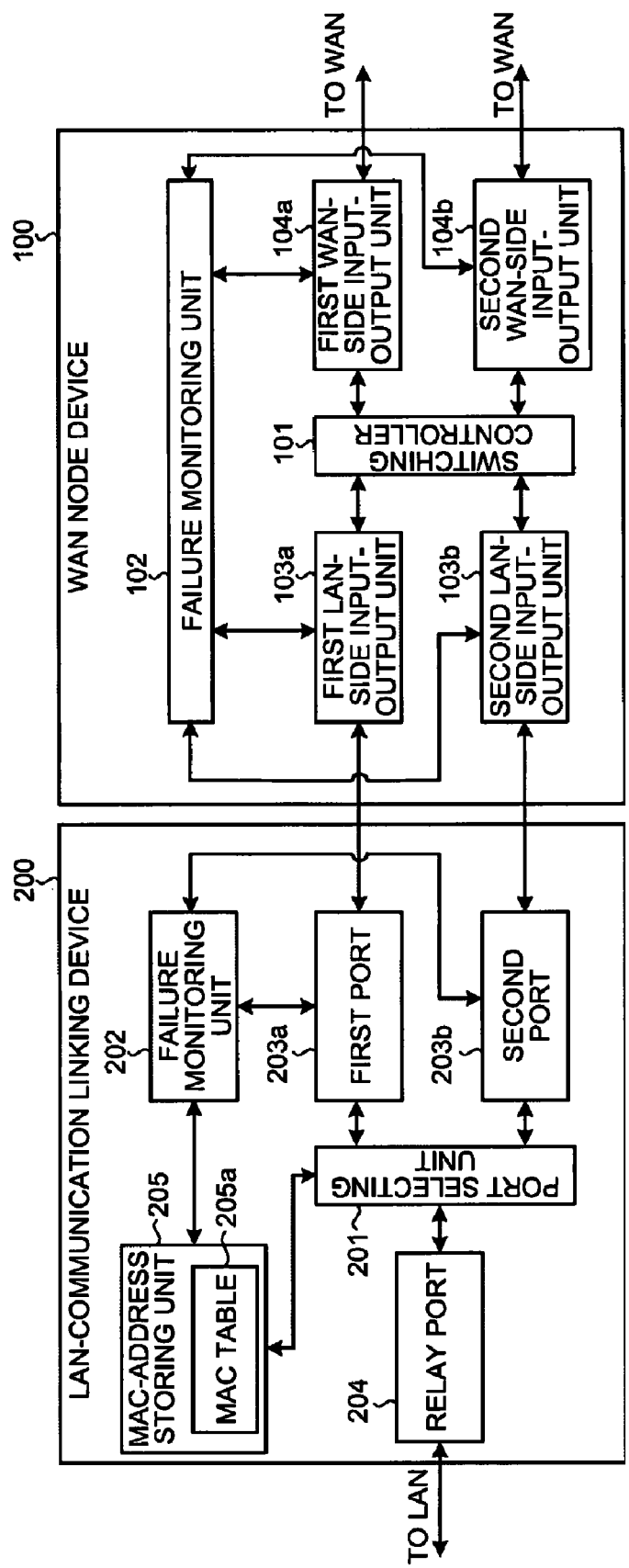
FIG. 5 is a functional block diagram of the communication relay system according to a third modification.

Next, a third modification of the present invention is explained below. FIG. 5 is a functional block diagram of the communication relay system according to a third modification. As shown in FIG. 5, a plurality of WAN-side input-output units 104 (a first WAN-side input-output unit 104a and a second WAN-side input-output unit 104b) of the WAN node device 100 are provided. As mentioned earlier in the embodiment, the first modification, and the second modification, the failure monitoring unit 102 is adapted to monitor failure in the WAN-side input-output units 104a and 104b, and if failure is detected in an active WAN-side input-output unit 104, the switching controller 101 is adapted to switch over to a normally functioning WAN-side input-output unit 104 by using the switch and the bridge, thus providing a backup for failure in the active line.

Although not shown in figures, a plurality of relay ports 204 of the LAN-communication linking device 200 can be provided in a similar manner. The failure monitoring unit 202 is adapted to monitor failure in the relay ports 204, and the port selecting unit 201 is adapted to switch over to a normally functioning relay port 204 if failure is detected in an active relay port 204, thus providing a backup for failure in the active line.

Thus, failure can be monitored in all linking units connecting each of the WAN node device 100 and the LAN-communication linking device 200 to external devices. If failure is detected in an active linking unit, the operation can be switched to a normally functioning linking unit, and a backup for failure in the active line can be provided.

A network configuration, in which the LAN-communication linking device of the LAN, which includes a user terminal device, is redundantly linked with the WAN node device (synchronous optical network (SONET) device) to establish a connection with the WAN (SONET network) by using the multilinking method and the wide-area network node device discussed in the above embodiment, is explained below. FIG. 6 is a drawing of a network configuration according to the embodiment.

As shown in FIG. 6, the WAN node devices that serve as add-drop nodes of the WAN (SONET network) are placed in switching centers A, B, and C. The LAN-communication linking device such as a router/hub that links the user terminal device included in the LAN of user residence A is connected to the WAN node device of the switching center A, and each of which is connected with duplex lines. Alternatively, the user terminal devices can be connected to the WAN node devices via a plurality of LAN-communication linking devices (refer to the user residence A in FIG. 1).

Thus, because a common VLAN function is used in the LAN-communication linking device, a network can be formed by using the existing equipment without requiring a special device. Moreover, a failure status of the stand-by line can be monitored without having to delink the stand-by communication link of the WAN node device, thus the availability of the system is improved.

Because an operation of a link aggregation function is not required, multiple communication paths can be created between the LAN-communication linking device and the WAN node device by using a plurality of WAN node devices that form the active lines and the stand-by line, thus the reliability is improved. Moreover, because a single stand-by line is provided for a plurality of active lines, line costs can be reduced further.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. The effects due to the embodiments are not to be thus limited.

All the automatic processes explained in the present embodiment can be, entirely or in part, carried out manually. Similarly, all the manual processes explained in the present embodiment can be, entirely or in part, carried out automatically by a known method. The process procedures, the control procedures, specific names, and data including various parameters mentioned in the description and drawings can be changed as required unless otherwise specified.

The constituent elements of the device illustrated are merely conceptual and may not necessarily physically resemble the structures shown in the drawings. For instance, the apparatus need not necessarily have the structure that is illustrated. The device as a whole or in parts can be broken down or integrated either functionally or physically in accordance with the load or how the device is to be used.

The process functions performed by the device can be entirely or partially realized by a central processing unit (CPU) (or a microcomputer such as a micro processing unit (MPU) or a micro controller unit (MCU)) or a computer program executed by the CPU (or a microcomputer such as MPU, MCU) or by a hardware using wired logic.

According to an embodiment of the present invention, a local area network (LAN) communication linking device and a wide area network (WAN) node device can be redundantly linked without having to prepare a special device for the LAN-communication linking device constituting LAN, or without delinking any line on the side of the WAN node device constituting WAN, or without using link aggregation.

According to an embodiment of the present invention, failure in a plurality of WAN-side input-output steps is monitored and when failure is detected, a normally functioning WAN-side input-output step is switched over immediately, thus enabling prompt failure handling.

According to an embodiment of the present invention, failure in a plurality of LAN-side input-output steps is monitored and source terminal identification data stored in an associated form at the LAN-side input-output step when failure is detected at monitoring are deleted immediately. Therefore, failure handling can be carried out easily along with prompt failure handling.

According to an embodiment of the present invention, because at least one of the LAN-side input-output steps is included in all virtual local area networks (VLANs), a number of stand-by LAN-side input-output steps corresponding to a plurality of LAN-side input-output steps is reduced, thus enabling line multilinking.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for redundantly linking a WAN node device that forms a WAN and a LAN-communication linking device that forms a LAN, to enable communication between the two, the method comprising:

first selecting, using a processor, one of a plurality of WAN-side input-output steps by which packets are exchanged between the WAN and the LAN in the WAN node device, wherein a packet from the LAN to the WAN is received and a packet from the WAN to LAN is sent, by the first selected WAN-side input-output step;

storing source terminal identification data of a packet received by the LAN-communication linking device, in association with identification data of a LAN-side input-output step at which the packet is received;

second selecting, based on the identification data of the LAN-side input-output step stored by the storing, the LAN-side input-output step from a plurality of LAN-side input-output steps to transmit a packet from the LAN to the WAN node device;

monitoring failure in the LAN-side input-output step; and deleting the source terminal identification data stored in association with the LAN-side input-output step when failure is detected at the monitoring.

2. The method according to claim 1, further comprising monitoring failure in the WAN-side input-output steps, wherein when failure is detected by the monitoring in the first selected WAN-side input-output step, other WAN-side input-output step is selected for receiving and sending a packet.

3. The method according to claim 1, wherein the LAN-side input-output steps include at least one LAN-side input-output step that belongs to VLANs that include all VLANs that the LAN-side input-output steps belong to.

4. A LAN-communication linking device, forming a LAN and redundantly linked with a WAN node device that forms a WAN, the LAN-communication linking device comprising:

a source terminal identification data storing unit that stores therein source terminal identification data of received packets, in association with identification data of a LAN-side input-output unit that has received the packets;

an input-output step selecting unit that transmits, by the LAN-side input-output unit selected, from a plurality of LAN-side input-outputs units, based on the identification data of the LAN-side input-output unit stored by the source terminal identification data storing unit, packets from the LAN to the WAN node device;

a failure monitoring unit that monitors failure in the LAN-side input-output unit; and a source terminal identification data deleting unit that deletes the source terminal identification data stored in association with the LAN-side input-output unit when failure in the LAN-side input-output unit is detected using the failure monitoring unit.

5. The LAN-communication linking line device according to claim 4, wherein the LAN-side input-output units include at least one LAN-side input-output unit that belongs to VLANs that include all VLANs that the LAN-side input-output units belong to.

6. A redundant linking system for redundantly linking a WAN node device that forms a WAN and a LAN-communication linking device that forms a LAN, to enable communication between the two, the system comprising:

a switching unit that selects one of a plurality of WAN-side input-output units by which packets are exchanged between the WAN and the LAN in the WAN node device, wherein a packet from the LAN to the WAN is received and a packet from the WAN to the LAN is sent, by the WAN-side input-output unit selected by the switching unit;

a source terminal identification data storing unit that stores therein source terminal identification data of a packet, in association with identification data of a LAN-side input-output unit that has received the packet;

an input-output step selecting unit that transmits, by the LAN-side input-output unit selected, from a plurality of LAN-side input-output units, based on the identification data of the LAN-side input-output unit stored by the source terminal identification data storing unit, a packet from the LAN to the WAN node device;

a failure monitoring unit that monitors failure in the LAN-side input-output unit; and a source terminal identification data deleting unit that deletes the source terminal identification data stored in association with the LAN-side input-output unit when failure in the LAN-side input-output unit is detected using the failure monitoring unit.

7. The redundant linking system according to claim 6, further comprising a failure monitoring unit that monitors failure in the WAN-side input-output unit, wherein when failure is detected by the failure monitoring unit in the WAN-side input-output unit, the switching unit selects other WAN-side input-output unit, for receiving and sending a packet.

8. The redundant linking system according to claim 6, wherein the LAN-side input-output units include at least one LAN-side input-output unit that belongs to a VLANs that include all VLANs that the LAN-side input-output units belong to.

* * * * *